US012729571B2

(12) United States Patent
Occhiogrosso

(10) Patent No.: US 12,729,571 B2
(45) Date of Patent: Sep. 8, 2026

(54) WINDOW AND DOOR LOCKING DEVICE

(71) Applicant: ProSeetz, LLC, Knoxville, TN (US)

(72) Inventor: Steve Occhiogrosso, Knoxville, TN (US)

(73) Assignee: Proseetz, LLC, Knoxville, TN (US)

( * ) Notice: Subject to any disclaimer, the term of this patent is extended or adjusted under 35 U.S.C. 154(b) by 71 days.

(21) Appl. No.: 18/975,646

(22) Filed: Dec. 10, 2024

(65) Prior Publication Data

US 2025/0198209 A1 Jun. 19, 2025

Related U.S. Application Data

(60) Provisional application No. 63/610,451, filed on Dec. 15, 2023.

(51) Int. Cl.
*E05C 19/18* (2006.01)

(52) U.S. Cl.
CPC .................................. *E05C 19/188* (2013.01)

(58) Field of Classification Search
CPC .................................................... E05C 19/188
See application file for complete search history.

(56) References Cited

U.S. PATENT DOCUMENTS 1,438,209 A * 12/1922 Attwood ................ B60J 1/2097 292/DIG. 28
3,085,300 A 4/1963 Carlston
3,820,285 A 6/1974 Shiffler et al.
3,931,723 A 1/1976 Kurtz
4,059,299 A 11/1977 Huntley
4,382,724 A * 5/1983 Green .................. B65D 90/587 105/310.1
4,469,358 A * 9/1984 Abbott .................. F25D 29/006 292/288
4,634,158 A * 1/1987 Jones .................... E05C 19/005 292/260
4,699,406 A 10/1987 Swanson, Jr.
5,265,921 A * 11/1993 Nikitas ................... E05C 19/18 292/DIG. 28
5,437,486 A 8/1995 Hoffman
5,552,768 A * 9/1996 Mikiel .................... E05C 17/54 200/61.93
5,787,956 A * 8/1998 Chen ...................... B60J 1/2091 24/324
5,971,450 A * 10/1999 Suarez .................... E05C 17/30 292/DIG. 28
6,126,211 A 10/2000 Dominquez
(Continued)

*Primary Examiner* — Mark A Williams
(74) *Attorney, Agent, or Firm* — McHale & Slavin, P.A.

(57) ABSTRACT

A portable lock mechanism designed to fortify the security of windows, sliding entry doors and hinged doors. The device comprises a base support with a threaded aperture and a mounting section integrates a rotatable linking arm, providing a foundation for the suction cup mounting base component. This suction cup mounting base forms a pivotal part of the locking mechanism. A rotatable lever concentric to the suction cup mounting pad and linking arm facilitates easy attachment to window panes or the flat surface of a door. A screw clamp with a threaded shank and adjustable pad ensures adaptability to various offset thicknesses, providing a universal application. Notably, the suction cup, when secured to a window pane or door panel, provides a robust locking system.

12 Claims, 14 Drawing Sheets

(56) References Cited

U.S. PATENT DOCUMENTS

| | | | | |
|---|---|---|---|---|
| 6,607,221 | B1 | 8/2003 | Elliott | |
| 8,752,868 | B2 | 6/2014 | Kim | |
| 9,546,505 | B1 | 1/2017 | McEachern | |
| 10,920,468 | B2 * | 2/2021 | Smith | E05C 17/525 |
| 2007/0209414 | A1 | 9/2007 | Bentley et al. | |
| 2008/0012349 | A1 * | 1/2008 | Finck | B26B 27/002 292/70 |
| 2016/0340948 | A1 * | 11/2016 | Mccullough | E05C 19/00 |
| 2020/0000260 | A1 * | 1/2020 | Peabody | A47G 25/0607 |
| 2020/0095823 | A1 * | 3/2020 | McDonough | E05C 19/00 |

* cited by examiner

WINDOW AND DOOR LOCKING DEVICE

PRIORITY CLAIM

This application claims a priority date based upon U.S. Provisional Patent Application Ser. No. 63/610,451, filed Dec. 15, 2023, entitled WINDOW AND SLIDING ENTRY DOOR LOCK, the contents of which are incorporated herein by reference.

FIELD OF THE INVENTION

The present invention relates generally to a window and door locking mechanism. More specifically, the present invention relates to a lock device having a suction cup mounting base and adjustable screw clamp that can be used on windows, sliding doors and/or hinged doors.

BACKGROUND OF THE INVENTION

Windows commonly used in residential and commercial building structures may have a lower that slides section vertically or horizontally on a track located within the sides of the window frame. Each sliding section of the window assembly usually has what is referred to as a window sash lock, which secures each sliding window section(s) in place when placed in the locked position. In a vertical window assembly, the top section is usually fixed in place. When the window sash lock is placed in the locked position, this prevents the sliding section(s) of the window from being opened. There are numerous window sash lock designs currently on the market, but all mostly follow a similar design and mechanical function. Although these window sash locks adequately secure the sliding window section(s) from being opened or vertically/horizontally moved by strong winds or manually by hand, these types of locks are easily overcome by intruders utilizing pry bars or other similar types of tooling. Windows are one of the most common areas of entry for intruders due to the ease of overcoming the design of most window sash locks available today.

Sliding entry doors that are commercially manufactured today are commonly used in residential and commercial building structures, whereas one or more sections of the door slide horizontally on a track located in the top and bottom of the sliding door frame. Each sliding section of the door assembly usually has what is referred to as a sliding door mortise lock, which secures each sliding door section in place, when placed in the locked position. One of the sliding entry door sections of a sliding door assembly is usually fixed in place and is non-moving or sliding. When the sliding door mortise lock is placed in the locked position, this prevents the sliding section(s) of the door from sliding open horizontally. Most commercial manufacturers of sliding entry doors use a similarly designed type of mortise lock.

There are numerous “aftermarket” lock designs currently on the market, each having a completely different design and security scheme. Although the sliding door mortise lock design and all other “aftermarket” sliding door locks adequately secure the sliding entry door sections from being opened by strong winds or manually by hand, these types of locks are easily overcome by intruders utilizing pry bars or other similar types of tooling. Sliding entry doors are one of the most common areas of entry for intruders due to the ease of overcoming the function and design of most factory and aftermarket sliding door locks available today.

The prevailing challenge with current windows, sliding doors or hinged door locking mechanisms lie in their vulnerability to intrusion, particularly through the application of force or leverage by unauthorized individuals. Conventional window sash locks and sliding door mortise locks, while effective in preventing unintentional opening due to external forces, often prove insufficient in deterring determined intruders armed with pry bars or similar tools. The ubiquity of such vulnerabilities poses a substantial security risk for both residential and commercial structures. Recognizing the need for an enhanced and more robust locking solution, the present invention addresses these shortcomings by introducing a novel and innovative locking mechanism, offering heightened resistance to unauthorized access attempts, and significantly bolstering the security measures for windows and sliding entry doors in diverse architectural settings.

SUMMARY OF THE INVENTION

The present invention discloses a portable lock mechanism designed to fortify the security of windows, sliding entry doors, and/or hinged doors. The device comprises a base support with a threaded aperture coupled to a suction cup mounting base allowing for versatile installation. This suction cup mounting base is equipped with a suction cup mounting pad. A rotatable lever concentric to the suction cup mounting base facilitates ease of attachment to window panes and doors.

The inventive concept incorporates a screw clamp with a threaded shank and adjustable pad. The screw clamp is strategically rotatably positioned within the threaded aperture of the base support, offering a customizable and secure engagement with adjacent window panes or doors. The adjustable pad of the screw clamp and a rotatable base support ensures adaptability to various pane thicknesses, providing a universal application. Notably, the suction cup, when releasably secured to a window pane or door, synergizes with the screw clamp to create a robust locking system. This dynamic interaction effectively inhibits the movement of window panes, serving as a formidable deterrent against intrusion attempts. Windows without good adhesion or that are weak in design can be reinforced with a suction cup mounting pad.

By seamlessly combining a suction cup mounting pad, a a rotatable lever, and suction cup mounting base with a versatile screw clamp, the invention addresses the shortcomings of conventional window and door locks with respect to security. The result is a highly portable and adaptable locking mechanism that enhances security measures for residential and commercial structures, offering reliable defense against unauthorized access and bolstering the overall safety of occupants and property.

In one exemplary embodiment, the present invention provides a portable window pane lock mechanism including: a base support having a proximal end and a distal end defining an upper surface and a lower surface, the proximal end including a threaded aperture extending from the upper surface to the lower surface; a mounting section connected substantially perpendicular to the distal end of the base support, the mounting section extending outwardly therefrom; a suction cup mounting base secured to the mounting section, the suction cup base having an upper surface and a lower surface; a suction cup coupled to the lower surface of the suction cup mounting pad by adhesive, the suction cup base including a rotatably attached lever coupled to the upper surface and concentric to the suction cup mounting base; and a screw clamp rotatably coupled to the base support aperture, the screw clamp having a threaded shank with a handle coupled to a proximal end and an adjustable pad secured to a distal end of the shank; wherein the suction cup is releasably secured to a window pane or a door pane, whereby the screw clamp is available to engage an adjacent window pane to inhibit movement of the window panes to thwart intrusion.

It will also be appreciated that various combinations of the features disclosed hereafter for a portable lock mechanism are also possible as desired.

BRIEF DESCRIPTION OF THE FIGURES

The present invention is illustrated and described herein with reference to the various drawings, in which like reference numbers are used to denote like system components/method steps, as appropriate, and in which.

DETAILED DESCRIPTION OF THE INVENTION

Figure 1:
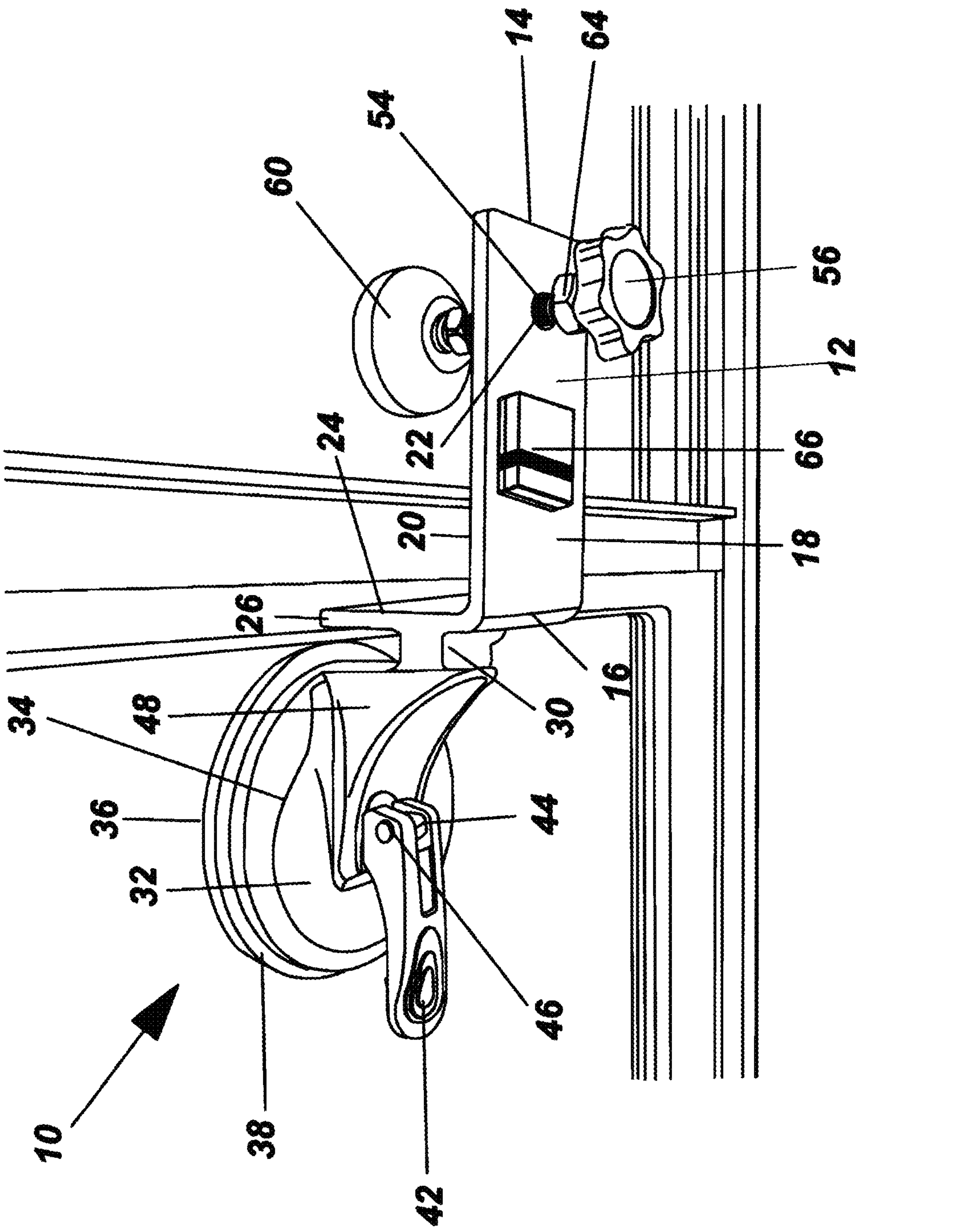
FIG. 1 is a perspective view of a portable window pane lock mechanism secured to a horizontally sliding window pane.
Figure 2:
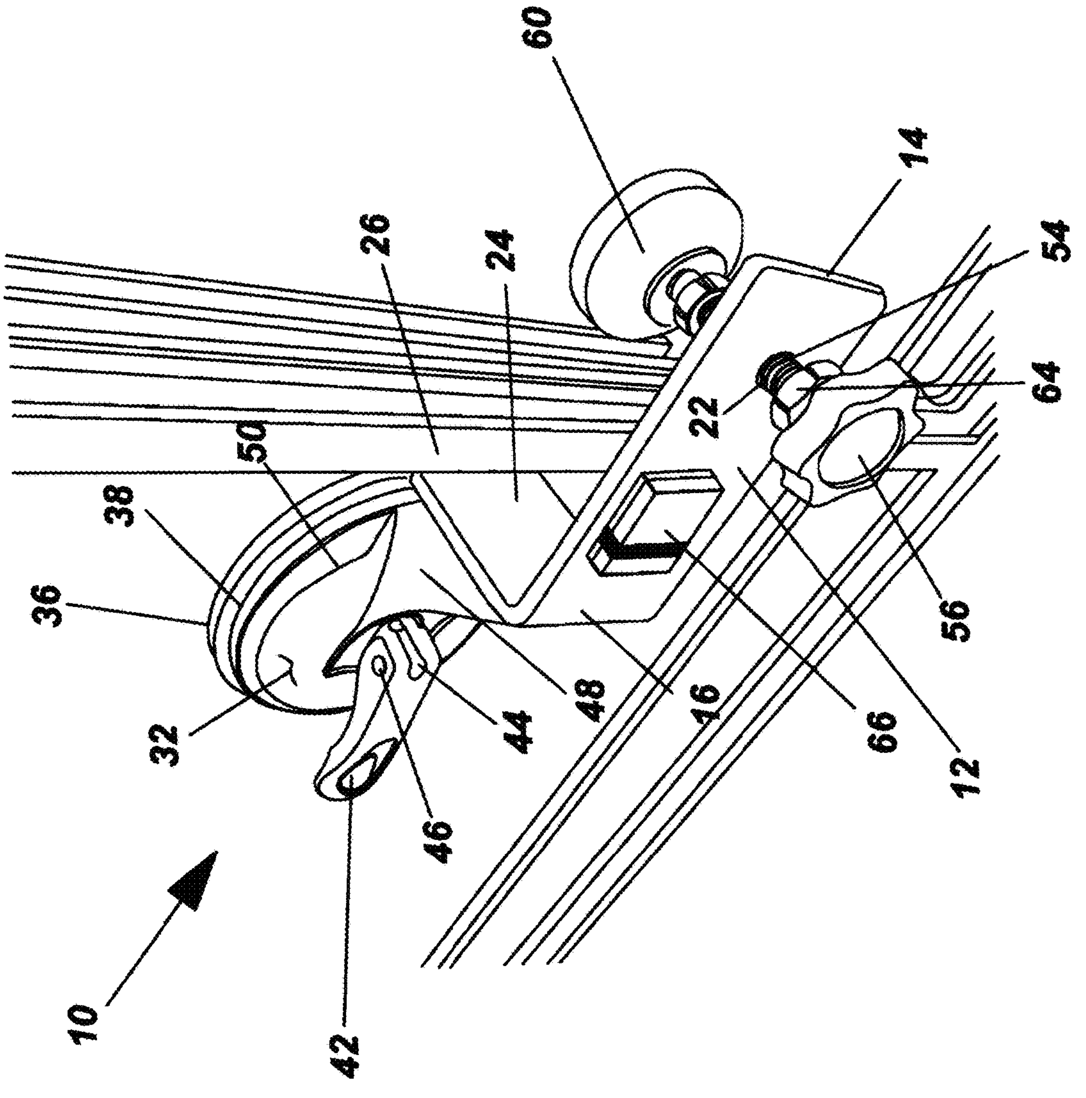
FIG. 2 is a right-side view of the portable window pane lock mechanism secured to a horizontally sliding window pane.
Figure 3:
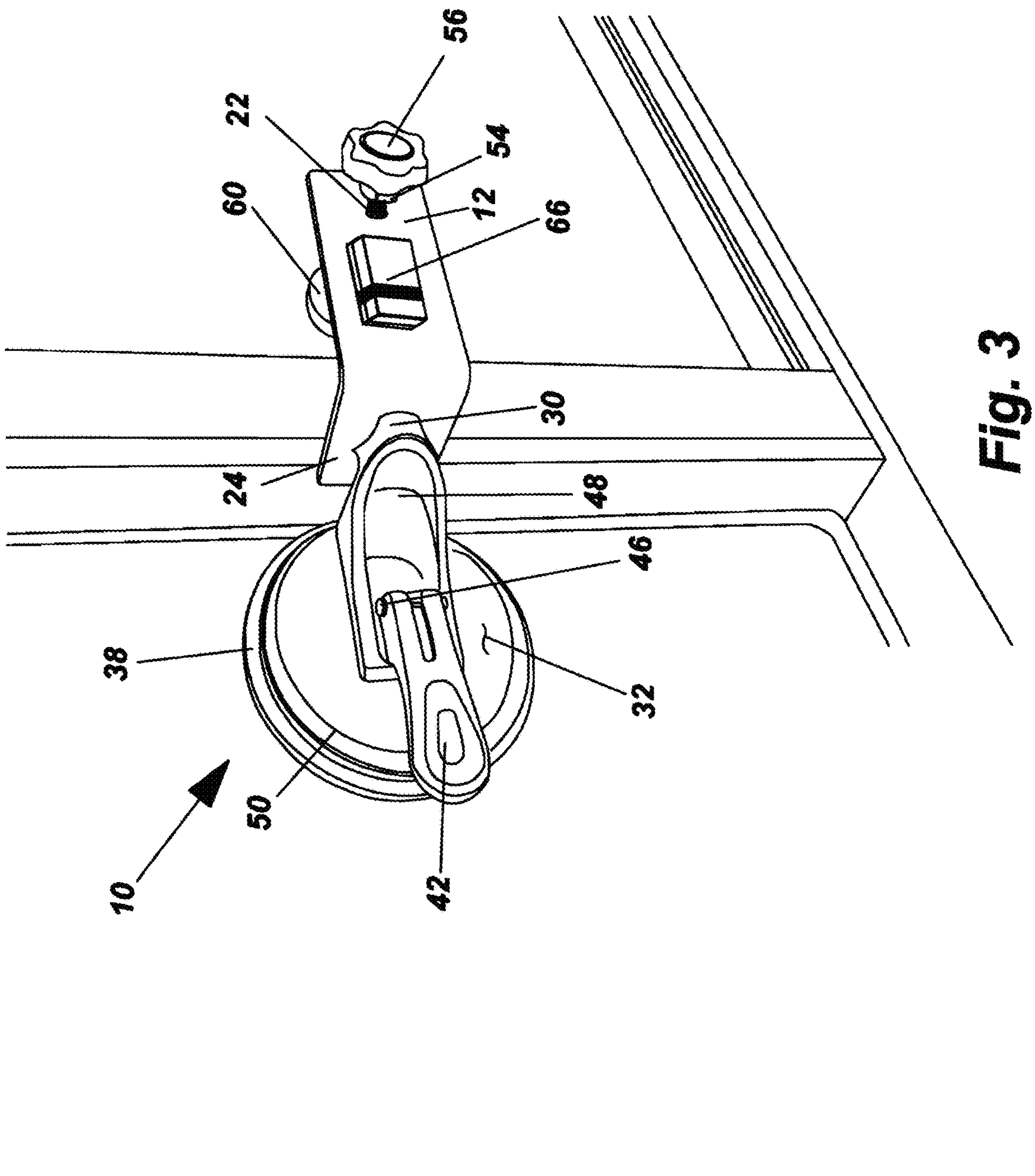
FIG. 3 is a left-side view of the portable window pane lock mechanism secured to a horizontally sliding window pane.
Figure 4:
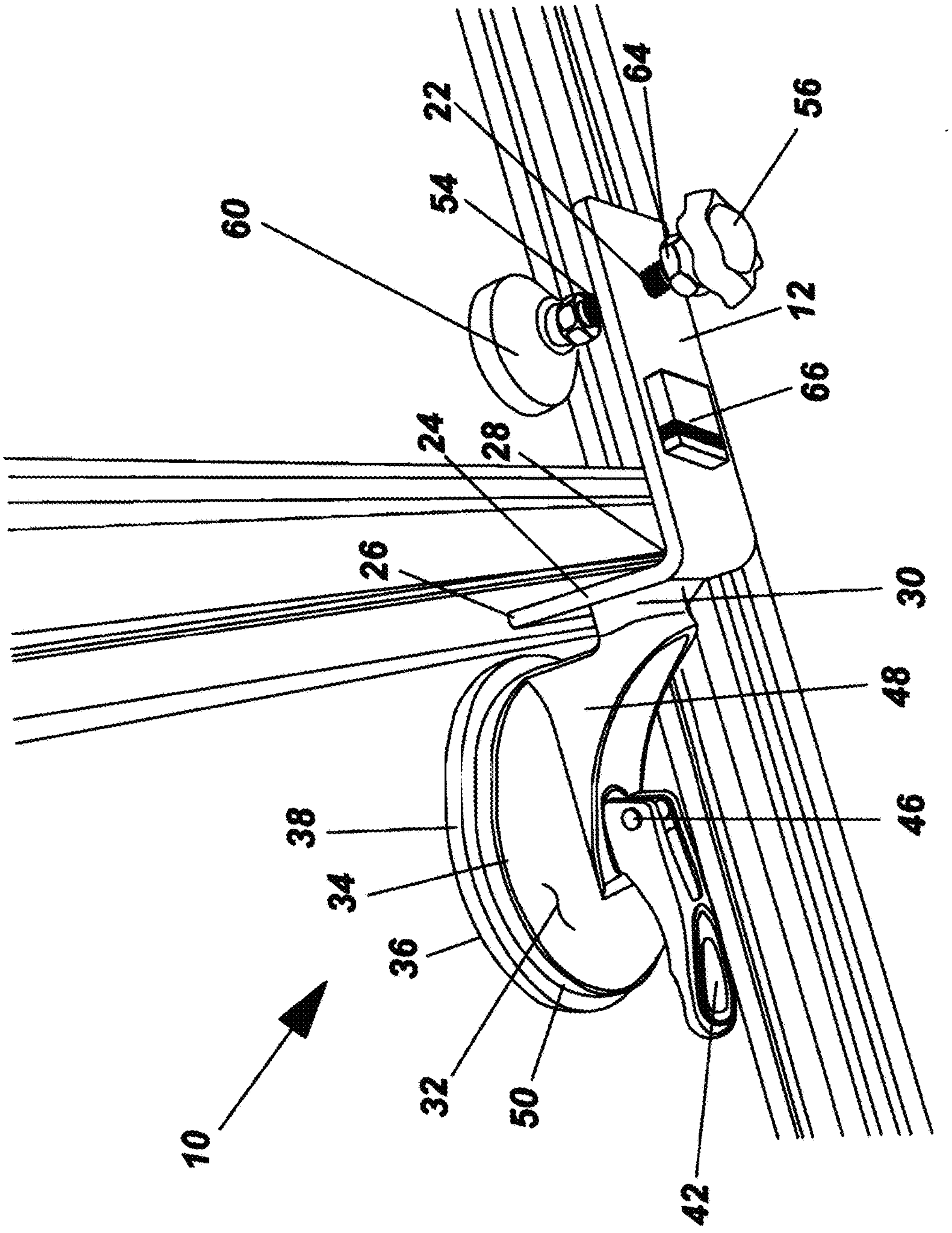
FIG. 4 is a top view of the portable window pane lock mechanism secured to a horizontally sliding window pane.

While the present invention is susceptible of embodiment in various forms, there is shown in the drawings and will hereafter be described a presently preferred, albeit not limiting, embodiment with the understanding that the present disclosure is to be considered an exemplification of the present invention and is not intended to limit the invention to the specific embodiments illustrated.

Now referring to the figures, in one exemplary embodiment, a portable window pane lock mechanism 10 includes a base support 12 having a proximal end 14 and a distal end 16 defining an upper surface 18 and a lower surface 20. Towards the proximal end 14 is a threaded aperture 22 extending from the upper surface 18 to the lower surface 20. A mounting section 24 is connected substantially perpendicular to the distal end 16 of the base support 12 and extends outwards to a mounting section distal end 26. The combination of the base support 12 and the mounting section 24 creates an L-shaped bracket. At the intersection of the base support 12 and the mounting section 24 is a curvature 28 that can be a sharp 90° curve or approximately 90° with or without a radius, however, the angle of the curve is not limiting.

The mounting section 24 includes a linking arm 30 that extends outwardly from the mounting section 24, preferably on an outside surface of the mounting section 24. The linking arm 30 is secured to a suction cup mounting base 34. The linking arm 30 can vary in length depending on the application. In the disclosed embodiment, the linking arm 30 is short (about 1 inch) to account for a small gap between window panes. In an alternative embodiment, the linking arm 30 may have a length of approximately 3 inches to account for a larger gap between window panes, typically found in sliding entry doors. The length of the linking arm 30 is not limiting. The linking arm may also be rotatable 180 degrees allowing use on multiple applications including window panes, offset hinged doors and non-offset hinged doors.

Figure 5:
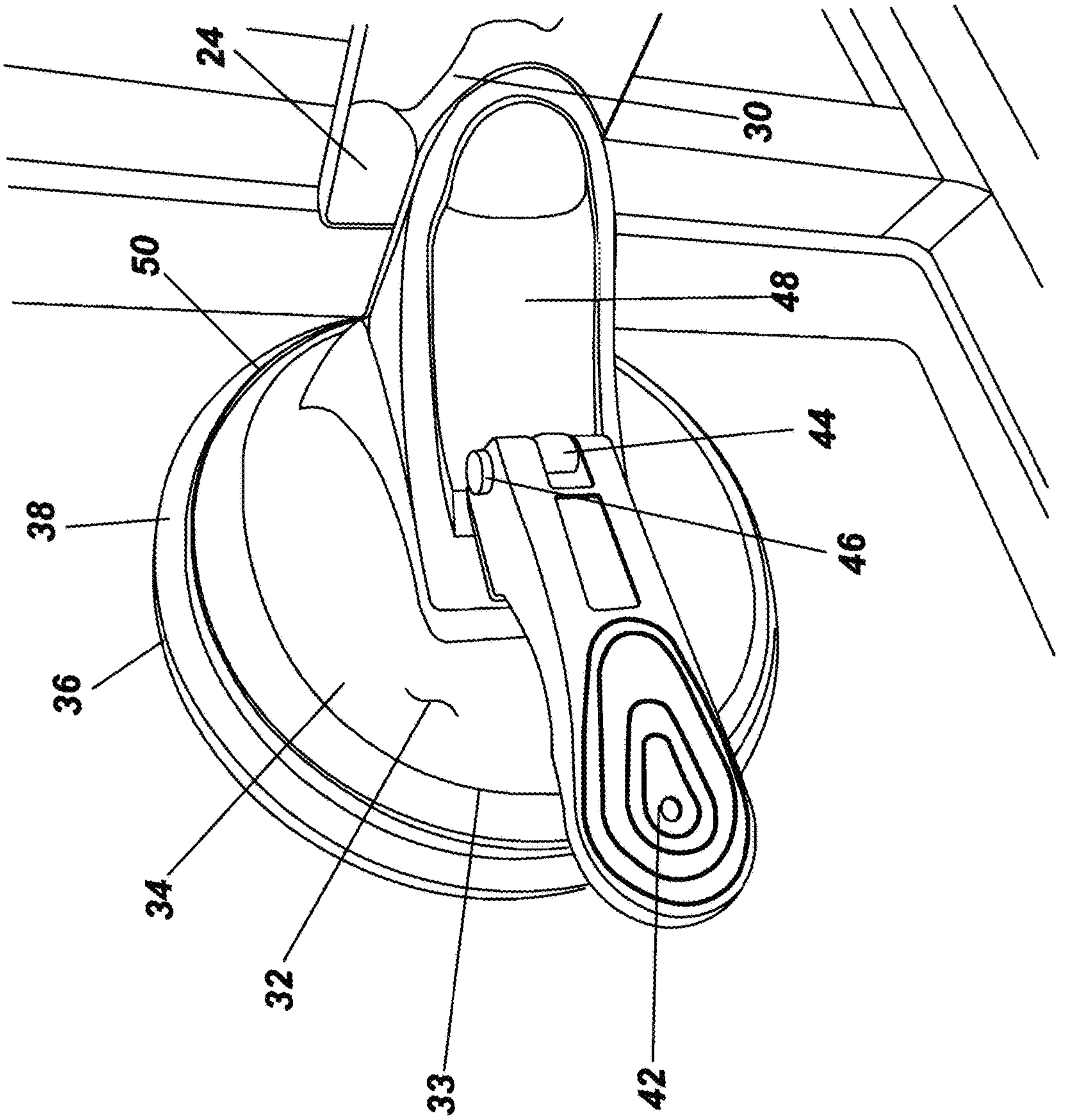
FIG. 5 is a perspective view of a suction cup mounting of the portable window pane lock mechanism for a base horizontally sliding window.

Further referring to the figures, namely FIG. 5, the suction cup mounting base 34 is a substantially flat, circular disc shape that is slightly smaller than a suction cup 38 and has an upper surface 32 and a lower surface 33. The terms "slightly larger" and "slightly smaller" refer to up to a ±0.5-inch difference in diameter. The size of the suction cup mounting base 34 and the suction cup 38 is not limiting. The suction cup 38 is secured to a window directly, or to a window having a suction cup mounting pad 36, if the window requires reinforcement. The suction cup mounting pad 36 includes a reusable adhesive or vinyl material that allows it to be attached to the glass, removed, and then reattached to the glass repeatedly. In addition, the suction cup 38 is made from a silicone or a like rubber type material that is ultra violet light resistant to protect from sun light exposure.

The suction cup mounting base 34 includes a rotatably attached lever 42 coupled to the upper surface 32 and concentric to the suction cup 38 and the linking arm 30. Once the portable lock mechanism 10 is placed against the glass, the suction cup 38 is secured by moving the lever 42 to the locked position. The lever 42 itself is secured to the curvature of the suction cup mounting base 34 by a C-clip 44 and a lateral pin 46 to ensure that the lever 42 remains secure. When the lever 42 is turned to a locked position, the locked position ensures a suitable pressure of suction holding the lock mechanism 10 to the glass in order for proper stability and security. On the contrary, pulling the lever 42 to an unlocked position will release the pressure and a user may easily remove the lock mechanism 10 from the glass.

In the disclosed embodiment, the suction cup mounting base 34 includes a ramp 48 on the upper surface 32 starting from the center of the suction cup mounting base 34 and extending out to an outside edge 50. The ramp 48 serves as a connection point for the linking arm 30 to connect the lock system body to the suction cup mounting base 34 at the mounting section 24. In the disclosed embodiment, the ramp 48 is integrated into the suction cup mounting base 34. In an alternative embodiment, the ramp 48 may be a standalone piece coupled to the suction cup mounting base 34, which may be rotatable (via components such as a swivel or ball joint) or hinged, so as to allow the portable lock mechanism 10 to secure to glass panes that are not parallel to one another, thus increasing the versatility of the lock mechanism 10. The size, shape, and number of ramps 48, if needed, are not limiting. The rotation allows the linking arm to be rotated 180 degrees allowing multiple installation configurations. For instance, the linking arm can accommodate an inwardly extending offset on a hinged door or, by rotating the linking arm 180 degrees, accommodate an outwardly extending offset on a hinged door.

Figure 6:
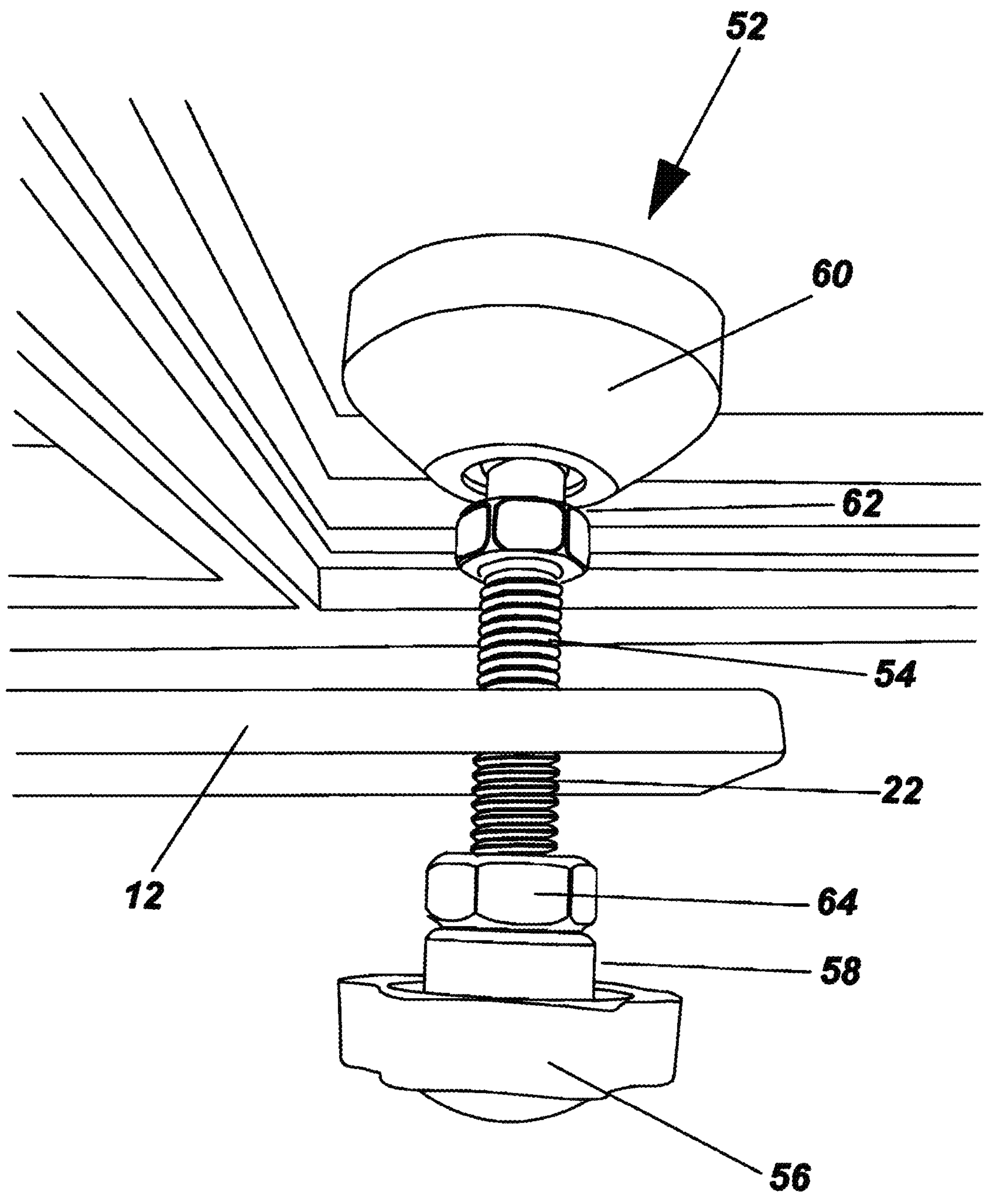
FIG. 6 is a top view of a screw clamp of the portable window pane lock mechanism for a horizontally sliding window.

Now referring to FIG. 6, the portable window pane lock mechanism 10 includes a screw clamp 52 rotatably coupled to the base support aperture 22. The screw clamp 52 has a threaded shank 54 with a handle 56 coupled to a proximal end 58 and an adjustable pad 60 secured to a distal end 62 of the shank 54. The handle 56 is rotatable in order to drive the adjustable pad 60 towards the glass of a window pane. A nut 64 is displaced between the upper surface 18 of the base support 12 and the lower end of handle 56 as a preventative stop from adjusting the handle too far, which would in turn exert too much pressure on the glass pane. The nut 64 is rotatably secured to the threaded shank 54 and is fully adjustable, allowing the user to set a particular distance that the handle 56, and in turn, the adjustable pad 60 is able to travel. In a preferred embodiment, the adjustable pad 60 is made of UV protected rubberized material so as to not damage or scratch the glass of a window pane.

Figure 7:
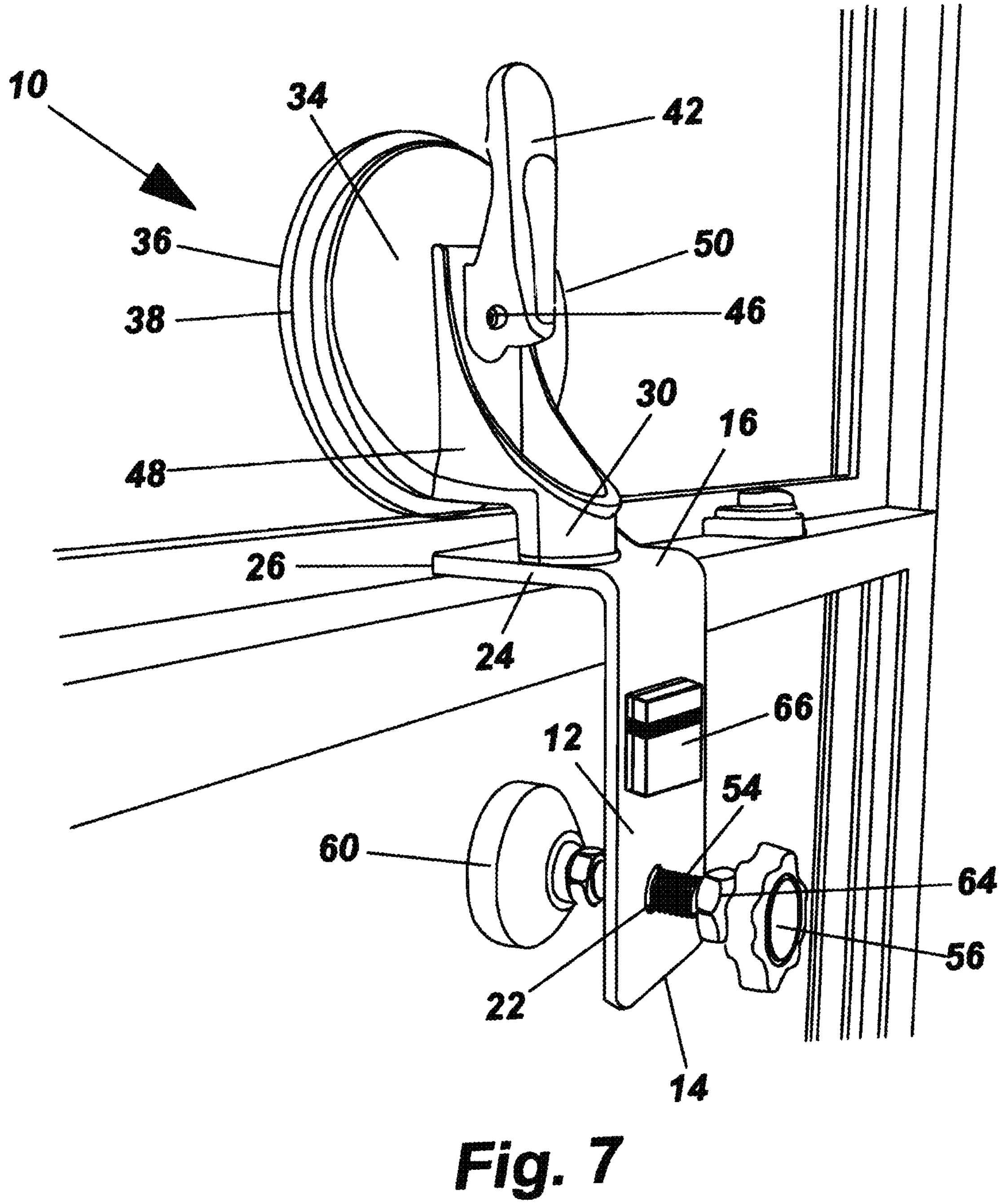
FIG. 7 is a left-side view of the portable window pane lock mechanism secured to a vertical sliding window pane.
Figure 8:
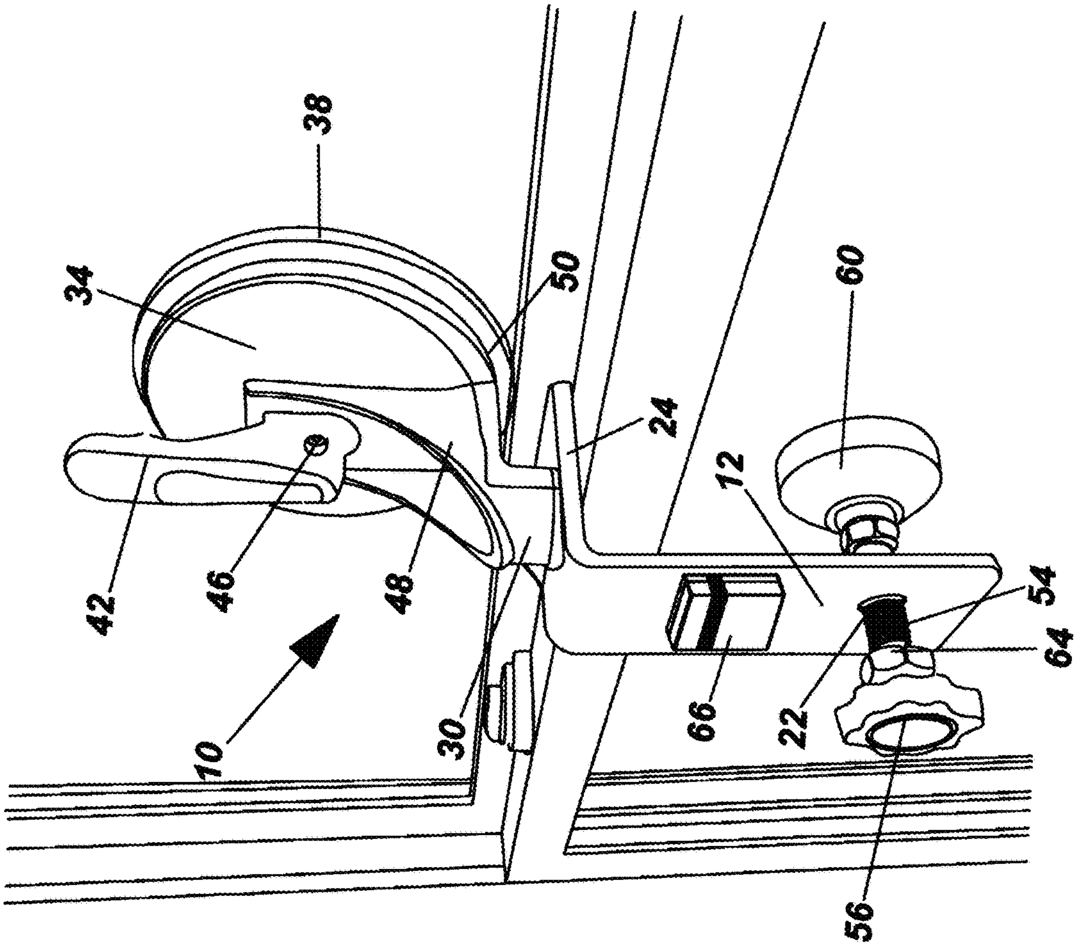
FIG. 8 is a right-side view of the portable window pane lock mechanism secured to a vertical sliding window pane.
Figure 9:
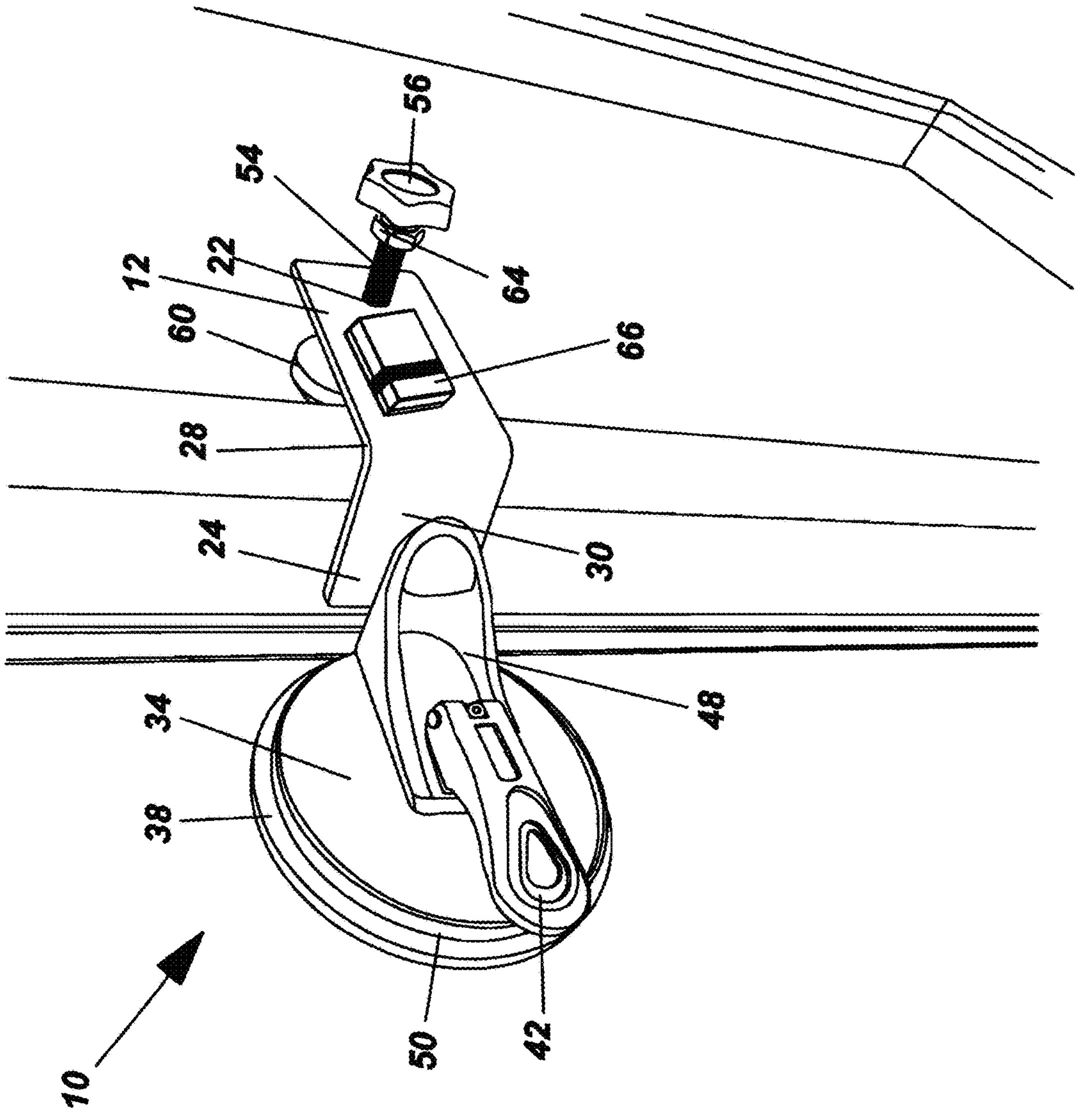
FIG. 9 is a left-side view of the portable window pane lock mechanism secured to a horizontally sliding door pane.
Figure 10:
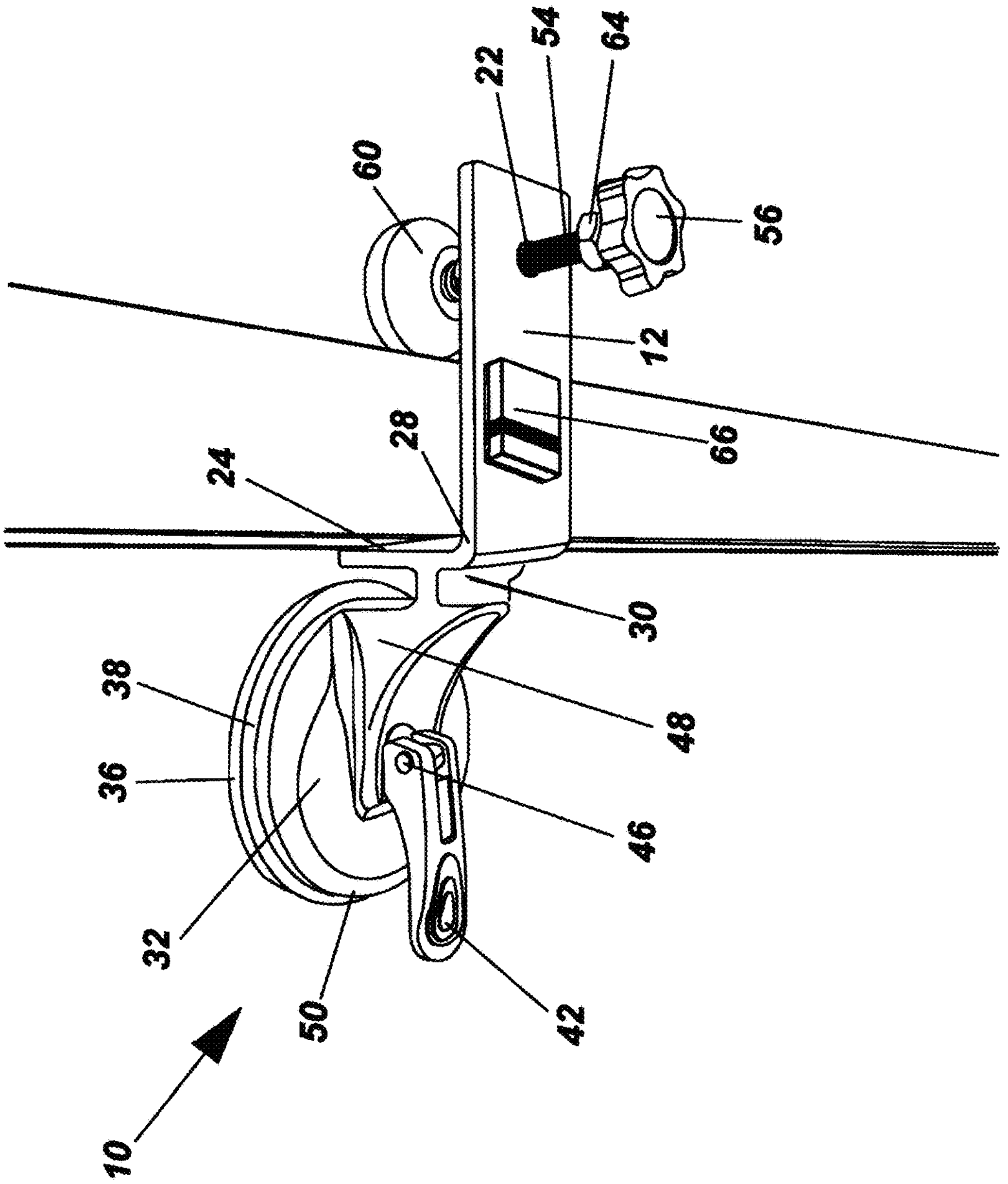
FIG. 10 is a top view of the portable lock mechanism secured to a horizontally sliding door.

In full combination of all the elements, the portable lock mechanism 10 allows for a suction cup 38 that is releasably secured to a window pane or a door pane, whereby the screw clamp 52 is available to engage an adjacent window pane to inhibit movement of the window panes to thwart intrusion. As disclosed, the lock mechanism includes the base support 12, the suction cup mounting base 34 and the screw clamp 52. In a preferred embodiment, the base support 12 and the suction cup mounting base 34 is constructed of aluminum, but can also be constructed of steel or other materials, such as reinforced fiberglass or plastic. The L-shaped portion and screw clamp of the mounting base is specifically designed to prevent both vertical and horizontal sliding section(s) of a window or sliding entry door from being forced out of a slide track located within the window or sliding entry door frame. Additionally, it prevents the sliding section of a window from being pried up vertically or horizontally (as in FIGS. 7 and 8) and the sliding section of a sliding entry door from being pried open horizontally (as in FIGS. 9 and 10).

In the event that the glass gets cracked or shattered due to an intruder attempting to overcome the lock mechanism 10 from the outside, the suction cup mounting pad 36 will prevent the suction cup 38 from detaching from the glass. The only way the lock mechanism 10 can be overcome would be for an intruder to shatter the entire window or sliding entry door section(s) to detach the lock mechanism 10 from the window or sliding entry door. In an alternative embodiment, each lock mechanism 10 will include multiple suction cup mounting pads, so the lock mechanism 10 can be secured to the window or door in multiple locations. The sliding window or door can then be secured fully closed or partially open, for air circulation and aftermarket pet doors, without having to relocate a single suction cup mounting pad 36 each time. The removable suction cup mounting pad 36 allows the use of the lock mechanism 10 when staying in hotels and other lodging accommodations, and can be removed when the stay at that location is concluded.

Figure 11:
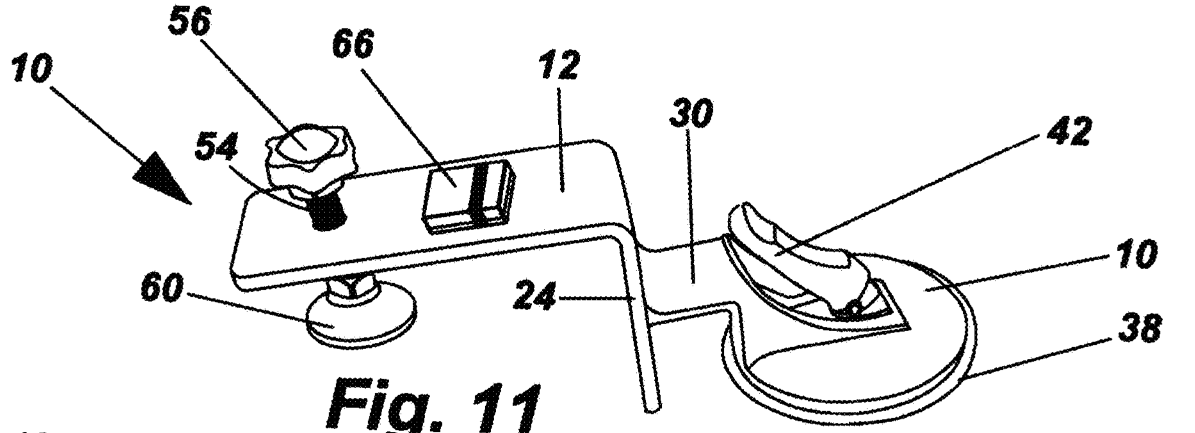
FIG. 11 is a front perspective view of the portable sliding door lock mechanism with a long length mounting section for horizontal sliding doors.
Figure 12:
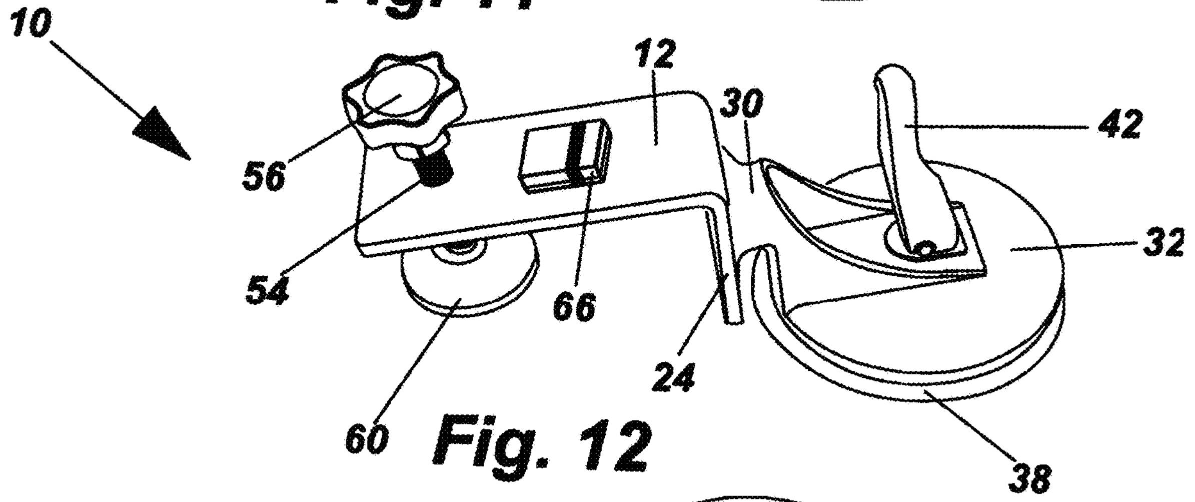
FIG. 12 is a front perspective view of the portable window pane/sliding door lock mechanism with a short length mounting section for vertically sliding windows.
Figure 13:
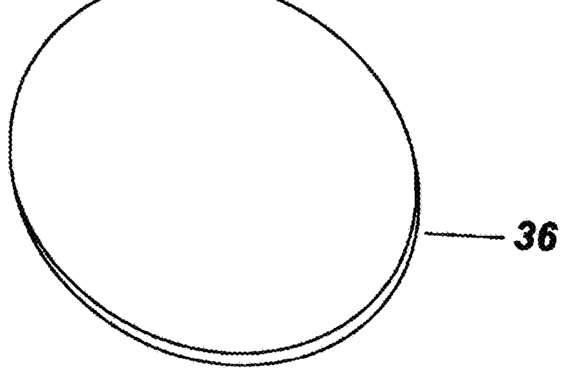
FIG. 13 is a perspective view of suction cup mounting pad with adhesive packing.
Figure 14:
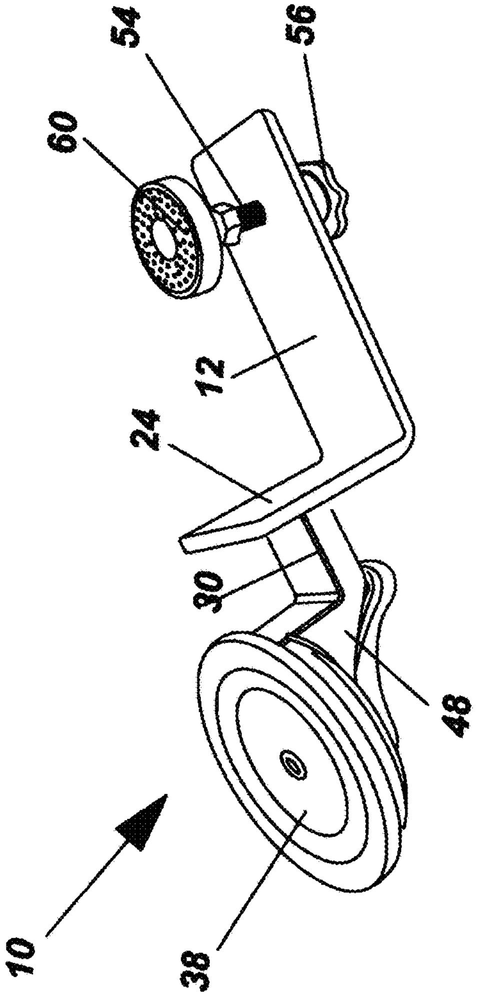
FIG. 14 is a rear perspective view of the portable window pane sliding door lock mechanism with a long length mounting section for horizontal sliding doors.
Figure 15:
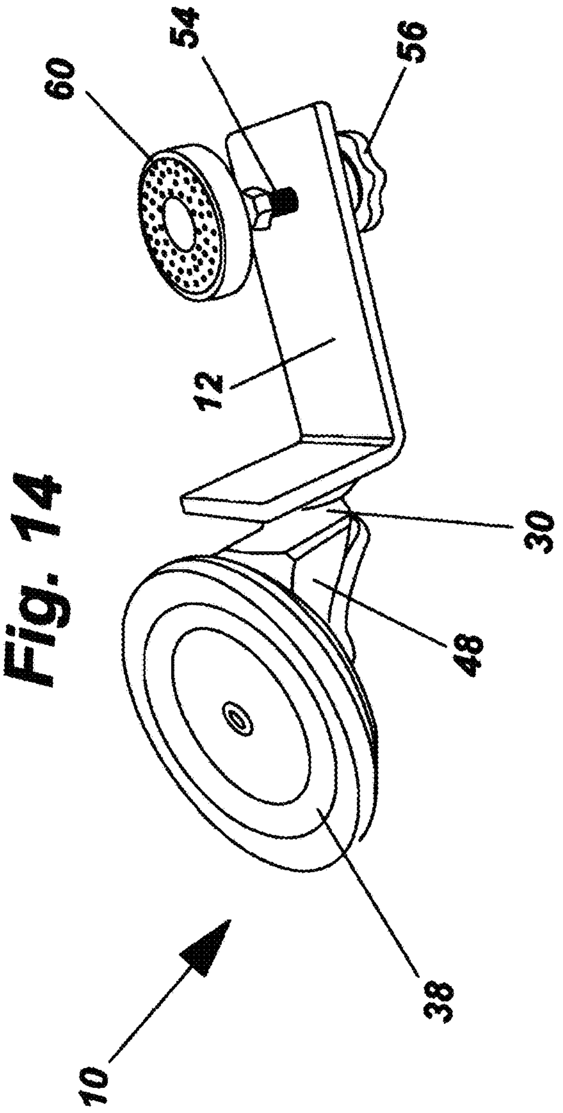
FIG. 15 is a rear perspective view of the portable window pane lock mechanism with a short length mounting section for vertical or horizontal sliding windows.

The portable lock mechanism 10 is accustomed to a regular window pane, a sliding entry door window pane, or a hinged door. FIGS. 11 and 12 depict a linking arm 30 that is preferable between 1 and 3 inches to account for a small gap between window panes, and this disclosed design is accustomed for regular window panes. In an alternative embodiment, the linking arm 30 may have a length of approximately 3 inches to account for a larger gap between window panes, typically found in sliding entry doors, or when used on hinged doors. The length of the linking arm 30 is not limiting.

These locks are both sized to universally fit most manufactured designs of the windows and sliding entry doors in existence today. The design of these particular locks not only provides a high level of security for intruders, they also allow the sliding window and door section(s) to be secured partially open, to allow for fresh air circulation or other purposes, such as pet entry doors with sliding entry doors. The locks are designed for easy placement or removal from the inside of a dwelling, as well as being very difficult for a child or pet to disable or remove the lock system. Additionally, in the event of a fire or similar emergency inside the dwelling, the lock system can be rapidly removed to allow occupants to escape the fire through the window or sliding entry door. It would be very difficult for an intruder to remove or overcome the lock system from the outside of a dwelling, even with the window or sliding entry door section(s) being locked partially open.

Disclosed in FIG. 11 is a suction cup mounting pad 36 that provides a load distributing mounting disk that can be applied to a thin or irregular window pane that is otherwise prone to breaking more easily than a conventional window pane. The suction cup mounting pad 36 is flexible and includes a reusable adhesive backing that allows it to be attached to the glass, removed, and then reattached to the glass repeatedly. The adhesive can be tacky material such that which is activated when the film is applied with a water based solution. Alternatively, the suction cup mounting pad 36 can be made of a film, such s vinyl, that sticks to glass without adhesive, relying on the film's material properties.

The suction cup 38 can either be applied directly onto a glass pane or onto a suction cup mounting pad 36 that is attached to the glass pane. When applied, the suction cup 38 is attached to the suction cup mounting pad 36 which distributes the pressure exerted by the locking mechanism 10 more evenly across the glass surface, reducing the risk of cracks or fractures or intruder shattering glass to overcome the suction cup attachment. This ensures that even fragile or unconventional glass panes can benefit from the locking mechanism 10 without compromising their structural integrity.

The portable window pane lock mechanism 10 further includes a mountable and removable multiple purpose sensor 66 on the base support 12. The sensor 66 employs multiple different functions, including but not limited to, shock and movement sensing, motion sensing, videography, and audible and visual alarming. For instance, the sensor 66 may include a piezoelectric material which can generate an electrical signal when deformed by vibrations. Acoustic monitoring can be performed by use of sound sensitive materials tuned to detect a particular signal, such as glass shattering, for triggering a signal that is audible or visual.

In the event that an intruder attempts to overcome the lock mechanism 10 from the exterior of the structure by striking the sliding window/door with a blunt object, such as a hammer, the shock sensor 66 will detect that. As well, the shock sensor 66 will detect movement in the event that someone attempts to remove the window lock from the inside of a structure, such as a child attempting to open the sliding window/door. The shock sensor 66 is adjustable for sensitivity, either on the sensor 66 itself, or through a wireless/hard wired central alarm system, so it can be set to detect a very low level to a high level of vibrations or shocks. The sensor 66 can operate independently by itself, or is designed to be compatible with all wireless/hard wired central alarm systems typically used in residential, commercial or industrial structures, as well as remotely monitored alarm systems. The compatibility is accomplished with either Bluetooth or any other wireless connectivity system type. The sensor 66 has an internal battery to maintain power to the sensor. As well, the sensor has a hard-wired port, which would allow connection to a hard-wired alarm system with a simple plug or wiring terminals, to power the sensor 66. In the event that the sensor 66 is hard wired to a central alarm system, it will monitor the battery and keep it charged up, as a backup system in the event of a power failure.

The sensor 66 will have a built-in motion sensor, which will monitor any movement within the structure in the general vicinity of the window lock sensor 66. In the event that someone passes in front of the motion sensor or approaches the sensor 66 with intent to remove the window/door lock from the inside of the structure, an audible siren will sound and/or a signal will be sent to a wireless/hard wired central alarm system.

The sensor 66 will have a micro camera within it to monitor the area around the window/door lock. The video camera will be activated by the motion sensor, and will have an internal memory chip to capture either still pictures or a video feed from the camera, until the battery power is exhausted. If the sensor 66 is hard wired to a central alarm system, the video camera feed can be monitored or recorded constantly, or when the video camera is activated by the motion sensor. The video camera may have infra red or the like night vision capabilities.

The sensor 66 will have a built-in siren that will sound when a shock or movement is detected, as well as when the motion sensor detects movement within the vicinity of the sensor 66. The decibels of the alarm/siren can be adjusted on the sensor 66 itself, or can be adjusted via a wireless or hard wired central alarm system.

Figure 16:
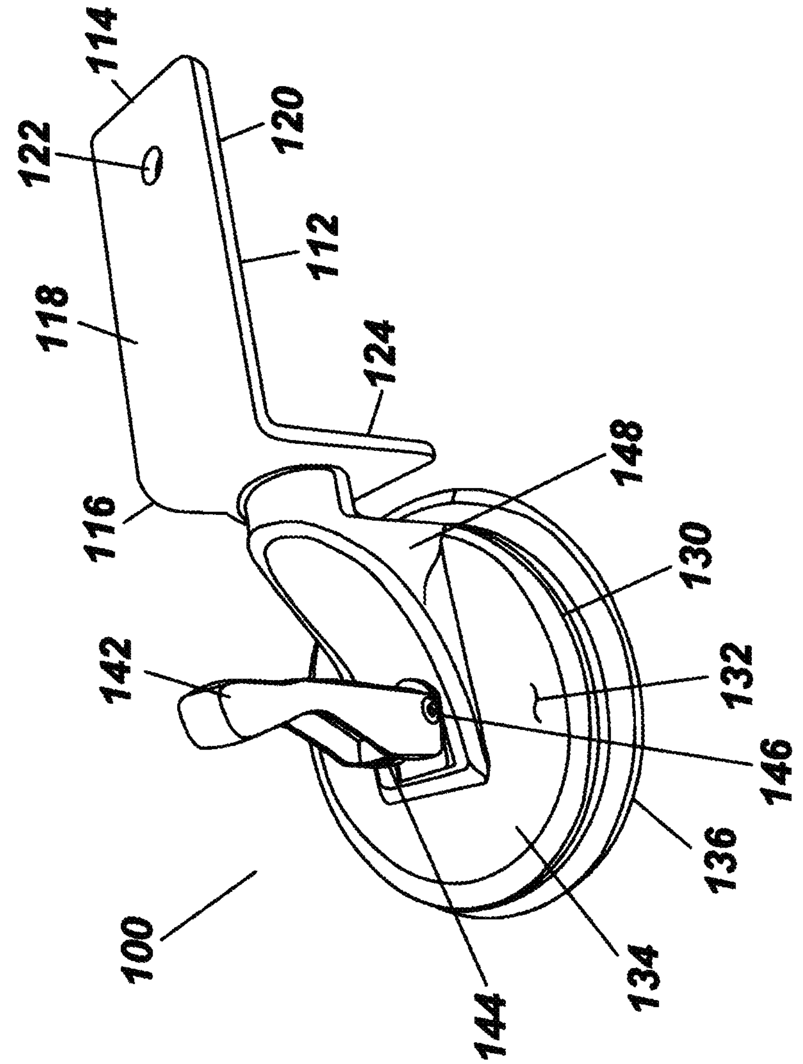
FIG. 16 is a front perspective view of the door lock mechanism for use in combination with a hinged door.
Figure 17:
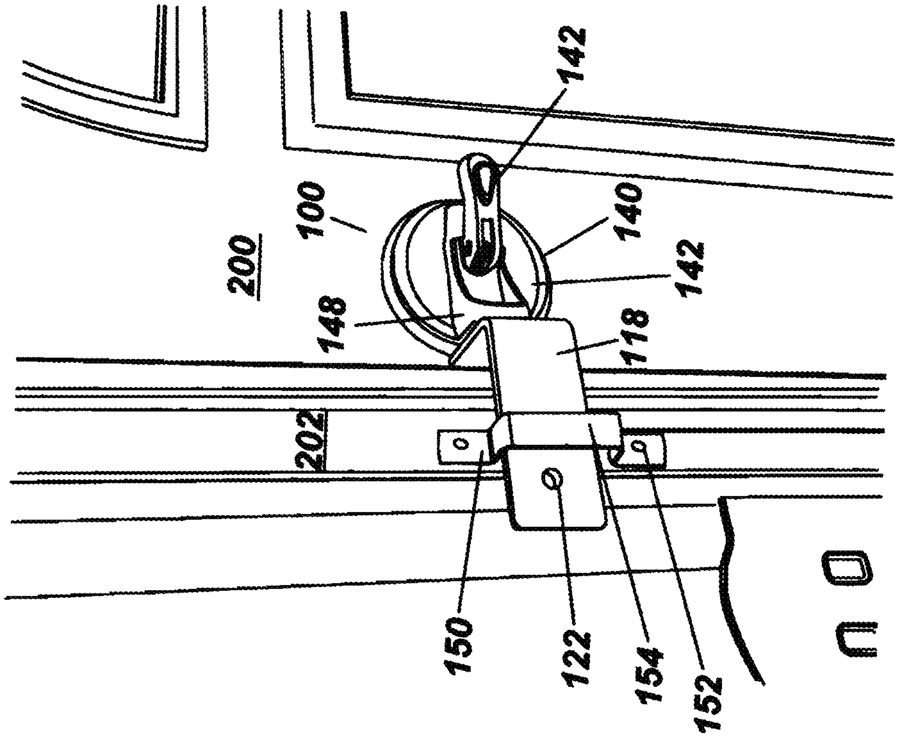
FIG. 17 is a perspective view of the door lock mechanism placed on a hinged door.

Referring to FIGS. 16 and 17, the lock mechanism 100 for use in locking a hinged door 200 is illustrated. The lock mechanism 100 includes a base support 112 having a proximal end 114 and a distal end 116 defining an upper surface 118 and a lower surface 120. Towards the proximal end 114 is a threaded aperture 122. A mounting section 124 is connected substantially perpendicular to the distal end 116 of the base support 112 and extends outwards to a mounting section distal. The combination of the base support 112 and the mounting section 124 creates an L-shaped bracket that provides a side step for securement to window panes that are offset.

The base support 112 is rotatably coupled to the ramp 148 by rotatable coupling 130. The rotatable coupling 130 allows the base support 112 to rotate 180 degrees to adapt to flush or raised door frames. The base support 112 can vary in length, depending on the application, to account for door frames.

The suction cup mounting base 134 includes a ramp 148 on the upper surface 132, starting from the center of the suction cup mounting base 134 and extending out to an outside edge. The ramp 148 serves as a connection point for the base support 112. In the disclosed embodiment, the ramp 148 is integrated into the suction cup mounting base 134; alternatively the ramp 148 may be a standalone piece coupled to the suction cup mounting base 134, which may be rotatable (via components such as a swivel or ball joint) or hinged, so as to allow the hinged door lock mechanism 100 to lock to door frames that are not parallel to the hinged door, thus increasing the versatility of the lock mechanism 10. The size, shape, and number of ramps 148, if needed, are not limiting.

Once the lock mechanism 100 is placed against a hinged door, the suction cup 138 is secured by moving the lever 142 to the locked position. The lever 142 itself is secured to the curvature of the suction cup mounting base 134 by a C-clip 144 and a lateral pin 146 to ensure that the lever 142 remains secure. When the lever 142 is turned to a locked position, the locked position ensures a suitable pressure of suction holding the lock mechanism 100 to the door 200 with the base support 112 positionable beneath a clamp holder 150 which prevents normal operation of the door 200. If the door does not allow for good adherence to the suction cup mounting pad, the suction cup mounting pad 136 can be applied to the door with adhesive or conventional screw fasteners, wherein the suction cup 138 can then secure to the suction cup mounting pad 136. Fastening a suction cup mounting pad may be necessary if the door surface is not smooth enough for suction cup adhesion. For instance, if the door has surface texture or was painted, the door will not have the same adhesion qualities as glass.

The clamp holder 150 depicted has a flange 154 that encompasses the base support 112, the clamp holder 150 fastened to the door frame by fasteners 152. The clamp holder is for illustration only, and can be built into the door frame to conceal the holder 150. Pulling the lever 142 to an unlocked position will release the pressure and a user may easily remove the lock mechanism 100 from the door 150. The threaded aperture can include a handle 56, as shown in the aforementioned embodiment, to prevent the lock mechanism from removal from the holder. The use of a handle 56 allows the hinged door 200 to open only slightly, providing a mechanical safety latch.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains"

one or more features, possesses those one or more features, but is not limited to possessing only those one or more features.

The terms “comprise” (and any form of comprise, such as “comprises” and “comprising”), “have” (and any form of have, such as “has” and “having”), “include” (and any form of include, such as “includes” and “including”), and “contain” (and any form of contain, such as “contains” and “containing”) are open-ended linking verbs. As a result, a method or device that “comprises,” “has,” “includes,” or “contains” one or more steps or elements, possesses those one or more steps or elements, but is not limited to possessing only those one or more elements. Likewise, a step of a method or an element of a device that “comprises,” “has,” “includes,” or “contains” one or more features, possesses those one or more features, but is not limited to possessing only those one or more features. Furthermore, a device or structure that is configured in a certain way is configured in at least that way, but may also be configured in ways that are not listed.

It is to be understood that while a certain form of the invention is illustrated it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A portable lock mechanism comprising:

a base support having a proximal end and a distal end defining an upper surface and a lower surface, said proximal end including a threaded aperture extending from said upper surface to said lower surface;

a mounting section positioned substantially perpendicular to said distal end of said base support;

a suction cup mounting base secured to said mounting section having a lower surface and an upper surface;

a suction cup coupled concentrically to said lower surface of said suction cup mounting base operatively associated with a rotatably attached lever positioned on said upper surface wherein said lever is rotated for operation of said suction cup; and a screw clamp rotatably coupled to said base support aperture, said screw clamp having a threaded shank with a handle coupled to a proximal end and an adjustable pad secured to a distal end of said shank;

wherein said suction cup is releasably secured to a window pane or door used in combination with said adjustable screw to inhibit the movement thereof.

2. The portable lock mechanism according to claim 1, wherein said mounting section includes a linking arm between 1 inch and 3 inches in length.

3. The portable lock mechanism according to claim 1, wherein said suction cup is a substantially flat, circular disc that is slightly larger than said suction cup mounting base.

4. The portable lock mechanism according to claim 1, wherein said suction cup is made from a silicone type material having ultraviolet inhibitors.

5. The portable lock mechanism according to claim 1, wherein said suction cup mounting base includes a ramp disposed on said upper surface, starting from the center of said suction cup mounting base and extending to an outer edge of said mounting base.

6. The portable lock mechanism according to claim 1, wherein said screw clamp includes a threaded nut displaced between said upper surface of said base support and the lower end of said handle and acts as a preventative stop from misadjusting.

7. The portable lock mechanism according to claim 1, wherein said adjustable pad is made of rubberized material so as not to scratch a window pane.

8. The portable lock mechanism according to claim 1, wherein suction cup mounting base is constructed of a material selected from the group consisting of: aluminum, steel, reinforced fiberglass, plastic, or any combinations thereof.

9. The portable lock mechanism according to claim 1, wherein said lock mechanism includes multiple suction cup mounting pads, wherein said lock mechanism can be secured to a window or sliding door in multiple locations.

10. The portable lock mechanism according to claim 1, wherein said mounting base includes a sensor for motion sensing, providing audible and visual alarming.

11. The portable lock mechanism according to claim 1, wherein said mounting base includes a sensor for motion sensing, providing videography recording.

12. The portable lock mechanism according to claim 1, wherein said mounting base is rotatably secured to said base support, wherein said suction cup is securable to an outwardly extending offset on a hinged door or rotated 180 degrees for securement to an inwardly extending offset on a hinged door.

* * * * *